April 4, 1967 D. M. MacMILLIN ETAL 3,312,158
FILM SPEED SENSING MECHANISM FOR CARTRIDGE CAMERA
Filed Aug. 20, 1964 2 Sheets-Sheet 2
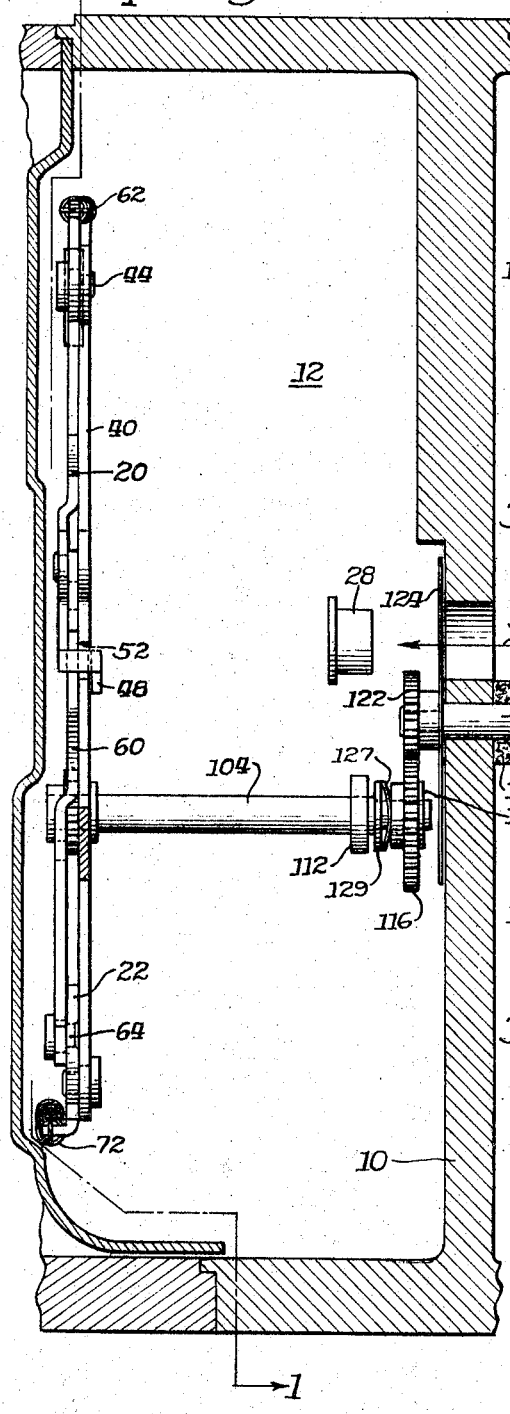
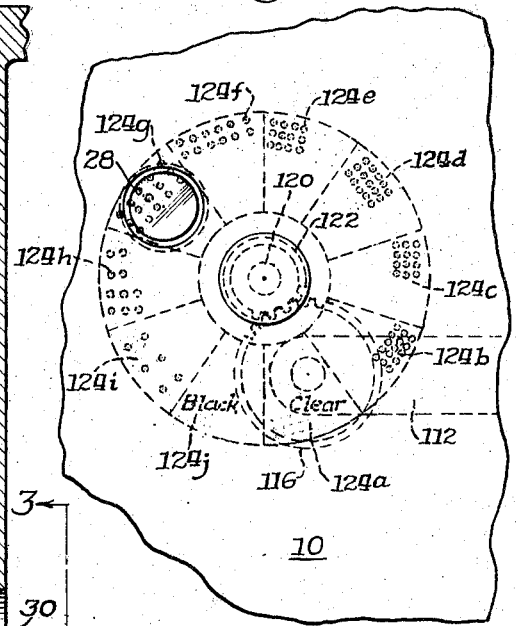
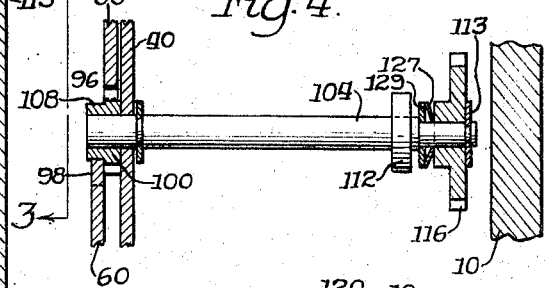
INVENTORS:
David M. MacMillin
Arthur C. Mueller.
BY Barry L. Clark
John E. Peeler Jr. Attys United States Patent Office 3,312,158
Patented Apr. 4, 1967

3,312,158
FILM SPEED SENSING MECHANISM FOR CARTRIDGE CAMERA
David M. MacMillin, Wilmette, and Arthur C. Mueller, Niles, Ill., assignors to Bell & Howell Company, Chicago, Ill., a corporation of Illinois
Filed Aug. 20, 1964, Ser. No. 390,811
5 Claims. (Cl. 95—10)

The present invention relates to improvements in photographic apparatus and particularly to the automatic compensation of an automatic exposure control system of a camera in accordance with the sensitivity of the film to be exposed in the camera.

It is well known that films of today are available in various speeds or sensitivities. Additionally, most color films are "color balanced" for exposure in either artificial light or daylight. Most color films have a first film speed for the daylight balanced films and a second film speed, $2/3$ of an $f$/stop faster, for the equivalent artificial light balanced films. Cameras having automatic exposure control systems commonly have a provision for manually adjusting the system in accordance with the sensitivity of the film. The adjustment may be overlooked, however, when the camera operator changes from one film to another or from daylight film to artificial light film of the same type. When the adjustment is so overlooked or when the camera operator is not aware such adjustment must be made, the second film is improperly exposed.

The instant improvement in cameras eliminates the possibility of overlooking the film speed adjustment by making it automatically, in accordance with the coding of cartridges as to the film supplied in them. These cartridges are coded as to the film sensivity by notches. One code notch varies in length between cartridges depending on the basic film sensitivity of the film therein. The presence or absence of a second code notch determines whether the basic film sensitivity indicated by the first notch should be modified to provide a different film sensitivity because the film is daylight balanced rather than artificial light balanced. Thus, the present invention is intended to adjust the exposure control system of the camera as to sensitivity of the film to be exposed in accordance with the length of the first code notch and the presence of absence of the second code notch in a coded cartridge.

An object of the present invention is to provide a mechanism to automatically compensate the automatic exposure control system of a camera in accordance with the sensitivity of the film to be exposed therein.

Another object of the present invention is to provide a novel code translation mechanism for use in a cartridge loaded camera having an automatic exposure control system.

Still another object of the present invention is to provide a mechanism to accurately adjust a compensation means in the exposure control system of a camera in accordance with the sensitivity of the film to be exposed in the camera.

Yet another object is to provide a novel improvement in a camera construction to variably control the quantity of ambient light impinging upon the photo cell in accordance with the sensitivity of the film to be exposed in the camera.

Further objects of the invention will appear from the description as hereinafter set forth in connection with the appended claims and the accompanying drawings wherein:

FIG. 1 discloses an enlarged elevational view of some elements of an embodiment of the present invention.

FIG. 2 is a view taken along section line 2—2 of FIG. 1.

FIG. 3 is a view taken along section line 3—3 of FIG. 2.

FIG. 4 is a view taken along section line 4—4 of FIG. 1.

FIG. 5 is a modification of the variable density disc restraining means.

Figure 1:
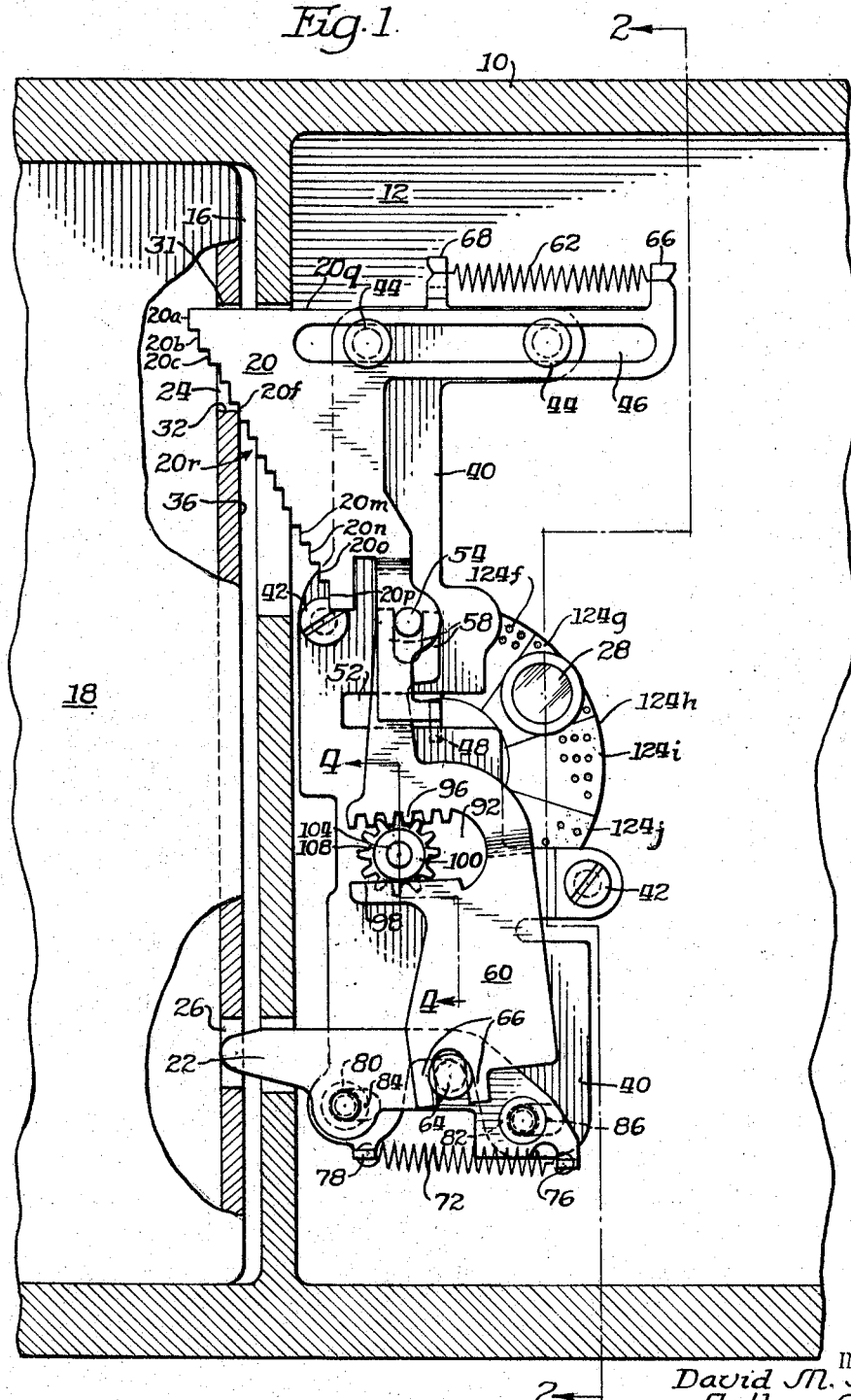

Disclosed in FIG. 1 is a portion of a typical motion picture camera housing 10 having a mechanism chamber 12 and a film chamber 16. The mechanism chamber contains the usual components including the camera drive motor, motor control and motion conversion mechanisms and elements of the exposure control system assembly (not shown). The film chamber accepts film in the various forms in which it may be supplied, and particularly as in the present embodiment in a cartridge loaded camera, in a cartridge 18. In addition to the usual shuttle tooth, aperture plate and film drive, the instant camera includes a basic film speed code notch feeler 20 and a supplemental code notch feeler 22. The feelers are normally biased into the film chamber to respectively seek a basic film speed code notch 24 and a supplemental code notch 26 of a cartridge 18 inserted into the film or cartridge chamber 16.

A light sensitive element or photocell 28 of the exposure control system is preferably mounted interior of camera housing 10 as seen in FIG. 2. Light rays reflected from the subject to be photographed pass through an objective (not shown) and along a light path 30 to impinge upon the photocell and the film in the cartridge.

The automatic film speed sensing mechanism for the exposure control system relies upon information supplied by the cartridge 18 in the form of the basic film speed code notch 24 and the presence or absence of the supplemental code notch 26. Notch 26 will be present only in cartridges containing artificial light balanced (Type A) color film. For a typical color film, the length of the basic code notch 24 will be the same for a cartridge supplied with either daylight balanced film or artificial light balanced film, although the A.S.A. (American Standards Association) film speed ratings are 25 and 40 respectively. However, the cartridge with the daylight film will not have a supplemental code notch 26. Accordingly, such a cartridge will engage and move feeler 22 to change the exposure control system setting predetermined by the basic notch 24 by $2/3$ of an $f$/stop. The cartridge loaded with artificial light film will have supplemental code notch 26 present and thus will not modify the exposure control system from the film speed set by the length of the basic code notch, since feeler 22 will remain in its outwardly biased position.

The upper opening boundary 31 of the basic film speed code notch 24 is not varied, regardless of film speed, and is positioned to clear a planar edge surface $20q$ of feeler 20. The lower opening boundary 32 of the notch is varied relative to the upper notch in accordance with variations in daylight or artificial light A.S.A. film speeds from one type of film to another. The length of the notch is relatively short for low A.S.A. ratings and relatively long for high A.S.A. ratings.

Feeler 20, formed as a plate of substantially triangular configuration, has the planar edge $20q$ along one side and another edge $20r$ angled relative to the planar edge. The angled edge is shaped as a plurality of steps $20a$, $20b$, $20c$, etc., with each step designed to change the exposure control system $1/3$ of an $f$/stop or its equivalent in film speed. As disclosed, each step has a face portion which will be engaged by a front portion 36 of the cartridge adjacent the changing lower boundary 32 of notch 24 as the cartridge is inserted in the film chamber 18. Each of the steps of feeler 20 correspond to the notches 24 of film cartridges for films having various A.S.A. ratings. When a cartridge has a relatively long notch 24 (high A.S.A. rating) the feeler 20 will be engaged on one of its lower steps. When feeler 20 engages the cartridge with its last step 20p, the A.S.A. rating will be highest. To take up for possible backlash in the system, even the longest anticipated length of notch 24 will cause the feeler to be moved a slight distance before engagement by a front portion 36 of the cartridge.

The code translation mechanism, including the pair of feelers 20, 22, is mounted on a support plate 40 in the housing 10 by conventional means, such as screws 42. On the upper end portion of the support plate are located a pair of headed studs 44. Feeler 20 is formed with an elongated slot 46 through which the studs extend such that they serve as limiters of and aligners for the movement of the feeler. The lower end of feeler 20 is bent in the form of an arm 48 to extend through a cut out area 52 in support plate 40. The extension of the arm 48 behind the plate permits the arm to engage the plate, if necessary, and aid in aligning the feeler for rectilinear movement without sway. Also mounted on the lower end of feeler 20 is a pivot pin 54 about which the slotted end 58 of an elongated floating plate 60 rides.

Feeler 20 is normally biased into camera cartridge chamber 16 by a resilient means, such as spring 62, attached between a leg 66 on feeler 20 and a similar leg 68 on support plate 40. As a cartridge 18 is inserted into the cartridge chamber 16, (FIG. 1) engagement of a step face 20f of feeler 20 by a cartridge front portion 36 adjacent notch 24 of the cartridge 18 urges the feeler 20 inwardly of the camera mechanism chamber 12 against the biasing of spring 62 causing movement of floating plate 60 about the pivot axis through a pin 64 of the lower pin and slot 66 connection. The amount of motion of the plate is dependent upon the A.S.A. film speed rating as translated from basic film speed notch 24 through the motion of feeler 20.

The supplemental code notch feeler member 22 is located to enter supplemental code notch 26 and is normally biased into cartridge chamber 16 by a resilient member, such as a spring 72. This spring is connected between a leg 76 on feeler 22 and a leg 78 on the adjacent end of support plate 40. On feeler 22 are a pair of motion limiting headed studs 80, 82 which respectively extend through and move in short slots 84, 86 in the support plate. The pivot pin 64 is mounted on feeler 22 intermediate the studs 80, 82. The other slotted end 66 of floating plate 60 is slidably and pivotally positioned around the pin 64 to connect the plate for movement by feeler 22. Presence or absence of notch 26 in cartridge 18 determines whether feeler 22 will remain biased to its normal forward position or urged by the cartridge to a rearward position. When the feeler 22 engages a cartridge not having a corresponding notch, the floating plate 60 will be moved about the pivot axis through pin 54, from the position the plate has been moved to by the setting of feeler 20 as it moves into first notch 24.

Approximately in the center of the longitudinal length of floating plate 60 is a cut out area 92. On one surface of the plate bounding on this cut out area is a gear rack 96. The opposing surface is in the form of a riding portion 98. Positioned in cut out area 92 is a gear 100 fixedly mounted on one end of a shaft 104 which is rotatable about a fixed axis relative to the housing 10. Gear 100 and shaft 104 are rotated by the gear teeth of rack 96 when floating plate 60 is caused to be substantially rectilinearly moved relative to the shaft by corresponding movement of either or both of the feelers 20 or 22. Integral with but axially spaced from the teeth of gear 100 (as seen in FIG. 4) is a bearing surface 108 against which the riding portion 98 of floating plate 60 engages to aid in maintaining the teeth of the gear and the rack in mesh. Shaft 104 extends through and is mounted in a support arm 112 connected to housing 10. An intermediate gear 116 is mounted on shaft 104 in a manner to permit limited adjustment of the gear relative to the shaft. A spring washer 127 held against a washer 129 abutting a shoulder on shaft 104 maintains gear 116 in pressure engagement with retaining ring 113 to permit necessary rotational adjustment in manufacture to properly orient the amount of movement of other elements driven thereby with the motion of the feeler members.

Parallel with shaft 104 which has a gear 116 mounted at one end is a second shaft 120 about which is mounted a second intermediate gear 122 which meshes with gear 116 to rotatably drive a variable density disc 124 which is substantially fixed to shaft 120. A rotation restraining friction element of a compressible material, such as a felt or foam ring 126 between a portion of shaft 120 and housing 10 prevents free rotation of the disc and the assembly on which it is mounted. The friction element may also be a spring washer 126' as seen in FIG. 5. Thus, disc 124 is moved only when the shaft is rotated after the backlash is taken out of the system. An initial adjustment of the orientation of disc 124 relative to photocell 28 may be made by manually rotating shaft 120 causing gear 122 to rotate gear 116 relative to shaft 104. Gear 116 is frictionally held against a shoulder on shaft 104 by a spring washer 127 between the shoulder and a holding ring 129 to permit this adjustment.

Disc 124 has a plurality of wedge areas 124a, 124b, 124c, etc., of different densities or effective densities extending around the disc. In the present embodiment, the densities are graded from substantially clear to nearly opaque in a ten step range. Each of the densities except the adjacent first and last areas 124a, 124j differ from the adjacent density area by ⅔ of an f/stop or its equivalent in film speed modification. The number of density areas is selected to enable the exposure control system in cooperation with the light sensitive element 28 to be assigned a plurality of A.S.A. numbers from A.S.A 6 to A.S.A. 400. These numbers are related to the range of speeds or sensitivities of the various films which the operator may wish to use in the camera. The arcuate length of the outer portion of each density area is sufficient to cover the surface area of the light sensitive element 28 before which one such wedge area, or a part thereof will be positioned to limit, according to its respective density, a quantity of ambient light from impinging on the element. By positioning the disc 124 so that portions of two adjacent wedges are positioned in the optical path 30 before the light sensitive element, the number of distinct A.S.A. values obtainable will be approximately double the number of wedges. The disc 124 may, of course, also be formed with a continuous variation in density from clear to opaque rather than substantially distinct density areas.

When step 20p of feeler 20 is engaged by cartridge front portion 36 the feeler is substantially fully extended into the cartridge chamber 16. If feeler 22 is unmoved, the substantially clear wedge 124a will be rotated into the light path 30 before light sensitive element 28 to indicate to the exposure control system an A.S.A. value of 400. Similarly, when the feelers 20 and 22 are each fully pushed out of the cartridge chamber by engagement of step 20a and feeler 22 with a cartridge having no notches 24, 26, half of the most opaque wedge area 124j and half of the adjacent area 124i will be positioned before the element, indicating an A.S.A. 6 film speed. It is to be understood that the intermediate A.S.A. values will be obtained when the intermediate density areas are in the light path.

When a cartridge 18, supplied with artificial light balanced color film is inserted into cartridge chamber 16, the notches 24, 26 will be aligned with feelers 20, 22. The cartridge will move onto feeler 20 as the feeler moves into basic film speed notch 24 until a face portion such as 20f of a step is engaged by the front portion 36 of the cartridge adjacent the lower boundary of the notch. At this point, several steps of the feeler are now interior of a portion of the cartridge and several steps are still exterior thereof. After engagement of step face 20f, the feeler is pushed inwardly of the camera mechanism chamber 12. This motion will cause movement of floating plate 60 about the axis of the pin 64 in the lower pin and slot connection. Rack 96 is therefore caused to be moved in a substantially rectilinear path causing rotation of gear 100 and shaft 104 about a fixed axis. Rotation of shaft 104 causes the intermediate gears 116 and 122 to likewise rotate and position a selected density wedge, e.g. 126g of transparent disc 124 in the light path to the light sensitive element 28.

Since the cartridge contains artificial light balanced color film and has a notch 26 in the cartridge, notch 26 will move over feeler 22 without causing additional movement of the feeler. Thus, the code notch translating mechanism determines that the basic film speed is the same as the effective film speed and no changes are made in the rotation of disc 124 and the wedge in the light path to light sensitive element 28.

If the film had been of the same type color film, but balanced for daylight, feeler 20, floating plate 60 and disc 124 would have been adjusted in the same manner as above described. However, the absence of supplemental notch 26 would have caused the cartridge front portion 36 to engage the feeler 22 and move the same to its second position against the biasing of spring 72. Thus, floating plate 60 would be moved about a pivot axis through pin 54 in the upper pin and slot connection. Rack 96 would be given additional substantially rectilinear motion to rotate gear 100, shaft 104 and disc 124 a limited amount to introduce at least a part of the next denser wedge area 126h of disc 124 in the light path to light sensitive element 28. Thus, the basic film speed has been altered to the lower effective film speed of the daylight film.

In summary, the movement of one or both feelers translates the coded information of the cartridge into the exposure control system of the camera to permit a known reduction or withholding of the quantity of light reaching the light sensitive element of the system. This ambient light passing through the transparent disc and impinging upon the element determines the adjustment of the iris blades (not shown) to properly expose the film in a conventional manner.

It is to be understood that although the invention has been described primarily with respect to color film, black and white film may be supplied in the cartridges and will usually be supplied in cartridges not having a supplemental speed notch. It would also be understood that modifications and variations may be effected without departing from the scope of the novel concepts of the present invention.

We claim as our invention:

1. In a camera having a housing, a cartridge chamber and an automatic exposure control system including a photocell, the exposure control system being adjustable in accordance with the speed of the film to be exposed in the camera, the film being supplied in a cartridge insertable in the cartridge chamber, said cartridge having a first film speed notch, and further being adapted to have a second supplemental notch therein, the improvement comprising:
   plate means movable in said housing;
   first feeler means operably connected to said plate means;
   biasing means for biasing said first feeler means toward said cartridge chamber;
   second feeler means operably connected to said plate means; and
   variable density means operably connected to said plate means for movement therewith in response to movement of said plate means by said feeler means;
   said variable density means being effective to vary the amount of light striking the photocell in accordance with the movement imparted to said plate means by said feeler means when engaged by at least one of said notches,
   whereby said automatic exposure control system will be automatically compensated for variations in film speeds in accordance with the sizes and positions of notches in film cartridges adapted to be brought into operative engagement with said feeler means.

2. The camera of claim 1, wherein said first feeler means has a plurality of steps on an edge surface biased toward said cartridge chamber, said steps permitting said first feeler means to be moved to a plurality of positions relative to a cartridge inserted in said chamber in accordance with the length of said first film speed notch in said cartridge.

3. A motion picture camera as in claim 1, wherein the length of said first notch in said cartridge is predetermined in accordance with the speed of the film supplied in said cartridge, the location of one end surface of said notch being fixed and the location of the other end of said notch being variable depending on the film speed of the film supplied in the cartridge:
   said first feeler means having a planar edge parallel to and adjacent said one fixed surface when inserted into said notch;
   said first feeler means having a second edge at an angle relative to said planar edge, a plurality of steps being formed on said angled edge, each said step being a different distance from said planar edge in a direction parallel to the length of said first notch;
   whereby one of said plurality of steps on said first feeler means is engaged by said cartridge to move said feeler means and thereby position said variable density means before said light sensitive element.

4. In a camera having a housing, a cartridge chamber, and an automatic exposure control system including a light sensitive element on which light in a light path in said housing impinges, the exposure control system being adjustable in accordance with the speed of the film to be exposed in the camera, the film being supplied in a cartridge inserted in the cartridge chamber, said cartridge having a first film speed notch, and further being adapted to have a second supplemental notch therein, the improvement comprising:
   a support plate mounted in said housing;
   a floating plate adapted to be moved relative to said support plate;
   a first feeler member in pivotal connection with one end portion of said floating plate;
   means biasing said feeler member into said cartridge chamber and into said first notch in said cartridge;
   a second feeler member in pivotal connection with the other end portion of said floating plate;
   means biasing said second feeler member into said film chamber to seek said second notch in said cartridge;
   rack means on said floating plate;
   gear means adapted to be rotated by said rack means when said floating plate is moved; and
   disc means adapted to be rotated with said gear means; said disc means being substantially transparent and having a plurality of areas of different densities, which densities vary from substantially clear to nearly opaque, said disc being positioned in the light path to the light sensitive element to control the amount of light impinging upon the light sensitive element;
   whereby when said exposure control system is compensated for the basic speed of the film to be exposed in said camera as determined by the movement of said first feeler member into said first notch, said floating plate is caused to be moved and said disc rotated to select a density area and thereby adjust the quantity of light impinging upon said light sensitive element and when said second feeler member is caused to be moved against said second biasing means by the absence of said second notch in said cartridge, said exposure control system is further compensated.

5. In a camera having a housing, a cartridge chamber and an automatic exposure control system including a light sensitive element on which light in a light path in said housing impinges, the exposure control system being adjustable in accordance with the effective speed of the film to be exposed in the camera, the film being supplied in a cartridge inserted in the cartridge chamber, said cartridge having a first notch of a length determined in accordance with the basic speed of the film contained therein, said cartridge further being adapted to have a second supplemental notch therein when said basic speed is the effective film speed, the improvement comprising:

- a support plate mounted in said housing;
- an elongated floating plate adapted to be moved relative to said support plate in a plane substantially parallel therewith;
- a first feeler member in pivotal connection with one end portion of said floating plate;
- said first feeler member having an edge at an angle relative to its direction of movement;
- means biasing said feeler member into said cartridge chmber and into said first notch in said cartridge until said angled edge engages a portion of said cartridge adjacent said notch;
- a second feeler member in pivotal connection with the other end portion of said floating plate;
- means biasing said second feeler member into said film chamber to determine the presence of said second notch in said cartridge;
- rack means on said floating plate;
- gear means mounted on a shaft rotatable about a fixed axis and adapted to be moved by said rack means wherein said gear means is rotated when said floating plate is substantially rectilinearly moved so as to cause substantially rectilinear movement of said rack means relative to said fixed axis; and
- disc means on said shaft means adapted to be rotated with said gear means, said disc means being substantially transparent and having a plurality of wedges of different densities varying from substantially clear to nearly opaque, said disc being rotatably adjustable in the light path before the light sensitive element to predetermine the wedge required to be positioned in the path to control the quantity of light impinging upon the light sensitive element;
- whereby when said exposure control system is compensated for the basic speed of the film to be exposed in said camera as determined by the movement of said first feeler member into said first notch, said floating plate is caused to be moved and said disc is caused to be rotated to present a desired wedge before said light sensitive element and when said second feeler member is caused to be moved against said second biasing means by the absence of said second notch in said cartridge, said exposure control system is further compensated by additional reduction of the light to said light sensitive element caused by the movement before the light sensitive element of a wedge more dense than said first positioned wedge.

References Cited by the Examiner

UNITED STATES PATENTS

| 2,186,613 | 1/1940 | Mihalyi | 95—10 X |
| 3,125,939 | 3/1964 | Bundschuh et al. | 95—10 |

FOREIGN PATENTS

| 864,803 | 1/1953 | Germany. |

NORTON ANSHER, Primary Examiner.

J. F. PETERS, Assistant Examiner.